(12) United States Patent
Zhang (10) Patent No.: US 12,361,828 B2
(45) Date of Patent: Jul. 15, 2025

(54) COOPERATIVE VEHICLE-INFRASTRUCTURE SYSTEM, ELEVATION CONVERSION UPDATE METHOD AND APPARATUS BASED ON VEHICLE-INFRASTRUCTURE COOPERATION, AND STORAGE MEDIUM

(71) Applicant: Tencent Technology (Shenzhen) Company Limited, Guangdong (CN)

(72) Inventor: Yunfei Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 30 days.

(21) Appl. No.: 17/987,340

(22) Filed: Nov. 15, 2022

(65) Prior Publication Data

US 2023/0080410 A1   Mar. 16, 2023

Related U.S. Application Data

(63) Continuation of application No. PCT/CN2022/080047, filed on Mar. 10, 2022.

(30) Foreign Application Priority Data

Apr. 25, 2021 (CN) ........................ 2021110451795.8

(51) Int. Cl.
*G08G 1/137* (2006.01)
(52) U.S. Cl.
CPC .................... *G08G 1/137* (2013.01)
(58) Field of Classification Search
CPC .......... G08G 1/123; G08G 1/127; G08G 1/13; G08G 1/133; G08G 1/137
See application file for complete search history.

(56) References Cited

U.S. PATENT DOCUMENTS

| | | | |
|---|---|---|---|
| 2018/0113474 A1 | 4/2018 | Koda et al. | |
| 2022/0221290 A1* | 7/2022 | Chikamori | ........... G01C 21/387 |
| 2024/0015488 A1* | 1/2024 | Sui | .......... G01C 21/34 |

FOREIGN PATENT DOCUMENTS

| | | |
|---|---|---|
| CN | 105973244 A | 9/2016 |
| CN | 107063275 A | 8/2017 |

(Continued)

OTHER PUBLICATIONS

International Search Report for PCT/CN2022/080047 dated May 18, 2022.

*Primary Examiner* — Benyam Haile
(74) *Attorney, Agent, or Firm* — Sughrue Mion, PLLC (57) ABSTRACT

A cooperative vehicle-infrastructure system, including: a road side facility, an on-road vehicle, and an on board map server The system includes a road side map processor converting absolute elevation information of roads around the road side facility into road side map-based relative elevation representations according to peripheral road network information of the road side facility; an on board map processor converting absolute elevation information of roads around the vehicle into on board map-based relative elevation representations according to peripheral road network information of the vehicle; the on board map server communicating with the road side map processor and the on board map processor, updating and maintaining a conversion relationship between the road side map-based relative elevation representation and the on board map-based relative elevation representation of the same road, and synchronizing an updated conversion relationship to the on board map processor.

9 Claims, 8 Drawing Sheets

(56) References Cited

FOREIGN PATENT DOCUMENTS

| CN | 109766405 | A |   | 5/2019 |            |
|----|-----------|---|---|--------|------------|
| CN | 110648548 | A |   | 1/2020 |            |
| CN | 111123334 | A |   | 5/2020 |            |
| CN | 112629530 | A |   | 4/2021 |            |
| CN | 113205701 | A |   | 8/2021 |            |
| CN | 113206874 | A |   | 8/2021 |            |
| CN | 115134752 | A | * | 9/2022 | G01C 21/30 |
| JP | 2022108028| A | * | 7/2022 | G01C 21/3461 |

* cited by examiner

COOPERATIVE VEHICLE-INFRASTRUCTURE SYSTEM, ELEVATION CONVERSION UPDATE METHOD AND APPARATUS BASED ON VEHICLE-INFRASTRUCTURE COOPERATION, AND STORAGE MEDIUM

CROSS REFERENCE TO RELATED APPLICATIONS

This application is a continuation of PCT/CN2022/080047 filed on Mar. 10, 2022 and claims priority to Chinese Patent Application No. 202110451795.8 filed with the China National Intellectual Property Administration on Apr. 25, 2021, the contents of each of which being incorporated by reference herein in their entireties.

FIELD

The disclosure relates to the field of vehicle-infrastructure cooperation technologies, and specifically, to a cooperative vehicle-infrastructure system and an elevation conversion update method based on vehicle-infrastructure cooperation.

BACKGROUND

In a vehicle-infrastructure cooperation application, three-dimensional information (including a longitude, a latitude, and an elevation) of an object involved in the vehicle-infrastructure cooperation is crucial to the scale and precise application of the vehicle-infrastructure cooperation. Currently, the longitude and latitude information of the object involved in the vehicle-infrastructure cooperation is allowed to be provided to the outside world after being processed in a deflection and encryption manner, and the elevation information of the object involved in the vehicle-infrastructure cooperation is not allowed to be directly provided to the outside world. Therefore, how to formulate a reasonable vehicle-infrastructure cooperation solution under the condition that the elevation information is not allowed to be provided to the outside world is a technical problem that a person skilled in the art needs to study continuously.

SUMMARY

According to an aspect of one or more embodiments, there is provided a cooperative vehicle-infrastructure system, including: a road side facility, vehicles on a road, and an on board map server. The system further includes a road side map processor that is configured to load peripheral road network information of the road side facility being deployed in the road side facility, the road side map processor converting absolute elevation information of a plurality of roads around the road side facility into road side map-based relative elevation representations according to the peripheral road network information of the road side facility, the road side map-based relative elevation representation being used for describing a spatial location relationship between the plurality of roads around the road side facility. The system further includes an on board map processor that is configured to load peripheral road network information of the vehicle being deployed in the vehicle, the on board map processor converting absolute elevation information of a plurality of roads around the vehicle into on board map-based relative elevation representations according to the peripheral road network information of the vehicle, the on board map-based relative elevation representation being used for describing a spatial location relationship between the plurality of roads around the vehicle; and the on board map server communicating with the road side map processor and the on board map processor, updating and maintaining a conversion relationship between the road side map-based relative elevation representation and the on board map-based relative elevation representation of the same road, and synchronizing an updated conversion relationship to the on board map processor.

According to other aspects of one or more embodiments, there is also provided a method and non-transitory computer readable medium consistent with the system.

It is to be understood that the foregoing general descriptions and the following detailed descriptions are merely for illustration and explanation purposes and are not intended to limit the disclosure.

BRIEF DESCRIPTION OF THE DRAWINGS

To describe the technical solutions in the example embodiments of the disclosure more clearly, the following briefly introduces the accompanying drawings required for describing the example embodiments. The accompanying drawings in the following description show merely some embodiments of the disclosure, and a person of ordinary skill in the art may still derive other accompanying drawings from the accompanying drawings without creative efforts. In addition, one of ordinary skill would understand that aspects of example embodiments may be combined together or implemented alone.

DESCRIPTION OF EMBODIMENTS

To make the objectives, technical solutions, and advantages of the disclosure clearer, the following further describes the implementations of the disclosure in detail with reference to the accompanying drawings.

Exemplary embodiments are described in detail herein, and examples of the exemplary embodiments are shown in the accompanying drawings. When the following descriptions are made with reference to the accompanying drawings, unless otherwise indicated, same numbers in different accompanying drawings represent same or similar elements. The implementations described in the following exemplary embodiments do not represent all implementations that are consistent with the disclosure. On the contrary, the implementations are merely examples of devices and methods that are described in detail in the appended claims and that are consistent with some aspects of the disclosure.

The block diagrams shown in the accompanying drawings are merely functional entities and do not necessarily correspond to physically independent entities. That is, the functional entities may be implemented in a software form, or in one or more hardware modules or integrated circuits, or in different networks and/or processor apparatuses and/or microcontroller apparatuses.

The flowcharts shown in the accompanying drawings are merely examples for descriptions, do not need to include all content and operations, and do not need to be performed in the described orders either. For example, some operations may be further divided, while some operations may be combined or partially combined. Therefore, an actual execution order may change according to an actual case.

"Plurality of" mentioned in the disclosure means two or more. The term and/or describes an association relationship for describing associated objects and represents that three relationships may exist. For example, A and/or B may represent the following three cases: Only A exists, both A and B exist, and only B exists. The character "I" generally indicates an "or" relationship between the associated objects.

Some embodiments of the disclosure provide an elevation conversion update method based on vehicle-infrastructure cooperation, applicable to the foregoing cooperative vehicle-infrastructure system and performed by an on board map server in the cooperative vehicle-infrastructure system, the method including: monitoring an update status of a road side map-based relative elevation representation of a road in the road side map processor; and correspondingly updating a conversion relationship between a road side map-based relative elevation representation and an on board map-based relative elevation representation of the road according to an updated road side map-based relative elevation representation of the road in a case that it is monitored that the road side map-based relative elevation representation of the road has been updated in the road side map processor, to update and maintain a conversion relationship corresponding to the same road.

Some embodiments of the disclosure provide an elevation conversion update apparatus based on vehicle-infrastructure cooperation, applicable to the foregoing cooperative vehicle-infrastructure system and deployed on an on board map server in the cooperative vehicle-infrastructure system, the apparatus including: an elevation update monitoring module, configured to monitor an update status of a road side map-based relative elevation representation of a road in the road side map processor; and a conversion relationship update module, configured to correspondingly update a conversion relationship between a road side map-based relative elevation representation and an on board map-based relative elevation representation of the road according to an updated road side map-based relative elevation representation of the road in a case that it is monitored that the road side map-based relative elevation representation of the road has been updated in the road side map processor, to update and maintain a conversion relationship corresponding to the same road.

Some embodiments of the disclosure further provide an on board map server, including: a memory, storing computer-readable instructions; and a processor, reading the computer-readable instructions stored in the memory, to perform the elevation conversion update method based on vehicle-infrastructure cooperation described above.

Some embodiments of the disclosure further provide a computer-readable storage medium, storing computer-readable instructions, the computer-readable instructions, when being executed by a processor of a computer, causing the computer to perform the elevation conversion update method based on vehicle-infrastructure cooperation described above.

Some embodiments of the disclosure further provide a computer program product or a computer program, the computer program product or the computer program including computer instructions, the computer instructions being stored in a computer-readable storage medium. A processor of a computer device reads the computer instructions from the computer-readable storage medium, and executes the computer instructions, so that the computer device performs the elevation conversion update method based on vehicle-infrastructure cooperation provided in the foregoing various optional embodiments.

Vehicle-infrastructure cooperation is to use technologies such as wireless communication and the Internet to implement vehicle-vehicle and vehicle-infrastructure dynamic real-time information interaction, and to carry out active vehicle safety control and collaborative road management on the basis of full-time and space dynamic traffic information collection and fusion, to fully achieve effective cooperation between people, vehicles and roads, ensure traffic safety, and improve traffic efficiency, thereby forming a safe, efficient, and environmentally friendly road traffic system.

In a cooperative vehicle-infrastructure system involved in the disclosure, a road side facility is deployed beside a road side, to achieve road traffic safety under the cooperation of the road side facility.

Elevation refers to a vertical distance from a certain point to a reference plane, and absolute elevation refers to a vertical distance from a certain point to an absolute reference plane. The vertical direction may be understood as a direction of a plumb line, and therefore the absolute elevation may be understood as an altitude. Currently, absolute elevation information is not allowed to be directly provided externally. As a result, the current vehicle-infrastructure cooperation pilot area and demonstration area are mainly based on a planar road network to achieve vehicle-infrastructure cooperation.

However, in a multi-layer road network scenario of urban roads such as an overpass, and a viaduct, and a fly-over junction, and of expressways, in a case that the road side facility cannot transmit elevation information to a vehicle on a road, or the vehicle on the road cannot effectively distinguish elevation information transmitted by the road side facility, problems such as vehicle early warning misreport and a decision-making mistake may be caused.

Figure 1:
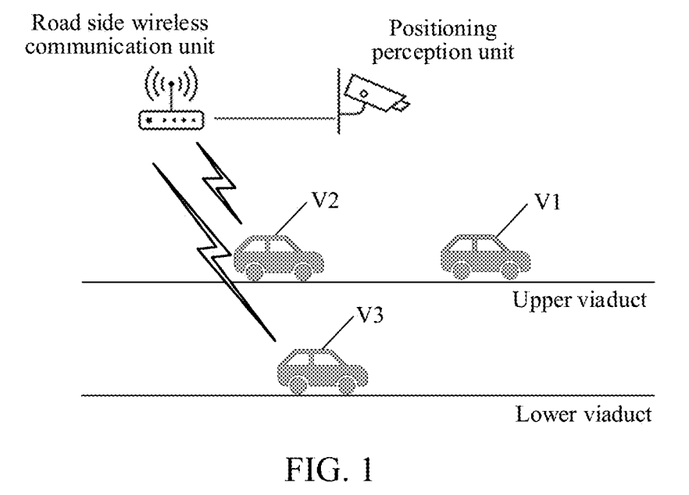
FIG. 1 is a schematic diagram of an exemplary emergency braking warning scenario implemented based on vehicle-infrastructure cooperation, according to some embodiments.

For example, in an emergency braking warning scenario implemented based on vehicle-infrastructure cooperation shown in FIG. 1, a vehicle V1 driving on an upper viaduct is suddenly static, a perception positioning processor deployed in the road side facility perceives a static state of the vehicle V1, and simultaneously obtains longitude and latitude location information and absolute elevation information of the vehicle V1. A road side wireless communication processor deployed in the road side facility broadcasts the longitude and latitude information of the vehicle V1, and a vehicle V2 issues a vehicle safety alarm to a driver of the V2 with reference to the longitude and latitude location information of the vehicle V1. In a case that the road side facility cannot transmit the elevation information to the outside world, or the vehicle V2 cannot effectively distinguish the elevation information transmitted by the road side facility, a vehicle V3 driving on a lower viaduct issues a vehicle safety alarm to a driver of the vehicle V3 according to the longitude and latitude location information of the vehicle V1, thereby causing the vehicle V3 to make a wrong decision.

It should be understood that the upper viaduct and the lower viaduct shown in FIG. 1 refer to two elevated roads with the same longitude and latitude location information but different absolute elevation information. In addition, an absolute elevation of the upper viaduct is greater than an absolute elevation of the lower viaduct, that is, a vertical distance between the upper viaduct and the ground is greater than a vertical distance between the lower viaduct and the ground.

An actual road network situation may be more complex than the road network situation shown in FIG. 1. In a case that the road side facility cannot transmit the elevation information to the outside world, or the vehicle cannot effectively distinguish the elevation information transmitted by the road side facility, a serious traffic accident is easily caused.

To resolve the foregoing problems, some embodiments of the disclosure provide a cooperative vehicle-infrastructure system. In the cooperative vehicle-infrastructure system provided in this embodiment of the disclosure, the absolute elevation information is replaced by a representation manner of a relative elevation representation, to meet requirements of national security and related laws and regulations, and to enable the vehicle and the road side facility to have consistent understanding for a relative elevation representation of a road in a map road network, thereby enabling the cooperative vehicle-infrastructure system to be accurately and effectively applied on a large scale in compliance with the laws and regulations.

It should be understood that the relative elevation usually refers to a vertical distance from a certain point to a relative basal plane, and the relative elevation representation mentioned in the disclosure is used for describing a spatial location relationship of roads in the longitude and latitude location information in a vertical direction, for example, a quantity of layers of the roads in the vertical direction, and is not used for describing a distance in the vertical direction.

Figure 2:
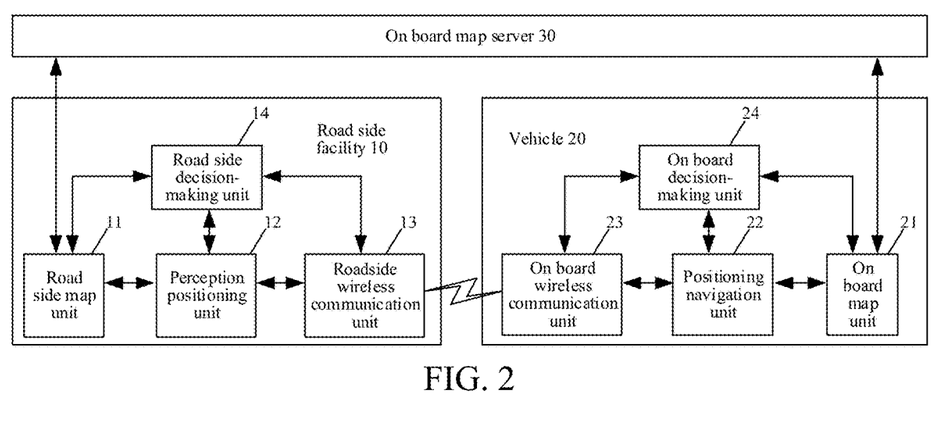
FIG. 2 is a schematic structural diagram of a cooperative vehicle-infrastructure system, according to some embodiments.

FIG. 2 is a schematic structural diagram of a cooperative vehicle-infrastructure system according to an exemplary embodiment of the disclosure. As shown in FIG. 2, the cooperative vehicle-infrastructure system includes a road side facility 10, an on-road vehicle 20, and an on board map server 30. A road side map processor 11, a perception positioning processor 12, a road side wireless communication processor 13, and a road side decision-making processor 14 are deployed in the road side facility 10. An on board map processor 21, a positioning navigation processor 22, an on board wireless communication processor 23, and an on board decision-making processor 24 are deployed in the vehicle 20. Both the road side map processor 11 and the on board map processor 21 establish a communication connection with the on board map server 30. The on board map server 30 may be a cloud server.

The road side map processor 11 is configured to maintain peripheral road network information of the road side facility 10, and the peripheral road network information is used for describing a spatial location relationship between a plurality of roads around the road side facility 10. The road side map processor 11 converts absolute elevation information of the plurality of roads around the road side facility 10 into road side map-based relative elevation representations according to the peripheral road network information of the road side facility 10. The road side map-based relative elevation representation is used for describing the spatial location relationship of the plurality of roads around the road side facility 10. For example, assuming that there are two roads around the road side facility 10, a road side map-based relative elevation representation of one road is A, a road side map-based relative elevation representation of the other road is B, and A and B are not equal, a spatial location relationship between the two roads can be determined according to a size relationship between A and B.

For a detailed process of using the road side map-based relative elevation representation to describe the spatial location relationship between the plurality of roads around the road side facility 10, reference may be made to content recorded in the subsequent embodiments, and details are not described herein again.

The perception positioning processor 12 is configured to perceive a traffic object on the road, and obtain longitude and latitude information and absolute elevation information of the perceived traffic object. For example, the perception positioning processor 12 mainly includes a perception module and a positioning module. The perception module may be one or more modules having perception functions, such as a camera module and a radar module, and this is not limited herein.

The road side wireless communication processor 13 is configured to transmit various types of messages to the outside world, for example, a road side information message (RSI), a road safety message (RSM), and the like. The road side wireless communication processor 13 may use vehicle to everything (V2X, which may be understood as a technology of Internet of Vehicles) communication. For example, the road side wireless communication processor 13 is specifically a road side processor (RSU).

The road side decision-making processor 14 is configured to provide a decision-making function of the road side facility 10 in a vehicle-infrastructure cooperation application.

The on board map processor 21 is configured to maintain peripheral road network information of the vehicle 20, and the peripheral road network information describes a spatial location relationship between a plurality of roads around the vehicle 20. The on board map processor 21 converts absolute elevation information of the plurality of roads around the vehicle 20 into on board map-based relative elevation representations according to the peripheral road network information of the vehicle 20. The on board map-based relative elevation representation is used for describing the spatial location relationship of the plurality of roads around the vehicle 20. For example, assuming that there are two roads around the vehicle 20, a road side map-based relative elevation representation of one road is C, a road side map-based relative elevation representation of the other road is D, and C and D are not equal, a spatial location relationship between the two roads can be determined according to a size relationship between C and D.

The positioning navigation processor 22 is configured to provide a positioning navigation function for the vehicle 20, to obtain a real-time location of the vehicle 20 through the positioning navigation processor 22. The positioning navigation processor 22 may use a global navigation satellite system (GNSS) positioning manner or a fusing positioning manner, and this is not limited herein.

The on board wireless communication processor 23 is configured to communicate with the road side facility 10, and may still use the V2X communication. For example, the road side wireless communication processor 13 is specifically an on board processor (OBU).

The on board decision-making processor 24 is configured to provide a decision-making function of the vehicle 20 in the vehicle-infrastructure cooperation application, for example, to make a safety alarm decision for the vehicle, to ensure driving safety of the vehicle 20.

In an exemplary application scenario, the perception positioning processor 12 obtains longitude and latitude location information and absolute elevation information of the traffic object on the road, and the traffic object includes at least one of a road event, a traffic sign, or a traffic participant. The road side map processor 11 converts the absolute elevation information of the traffic object into a road side map-based relative elevation representation according to the peripheral road network information of the road side facility 10 included in the road side map processor. The road side wireless communication processor 13 generates a road side notification message according to the longitude and latitude location information and the relative elevation representation of the traffic object, and broadcasts the road side notification message. A broadcast range of the road side notification message covers at least the plurality of roads around the road side facility 10.

The vehicle 20 driving within the coverage of the road side notification message receives the road side notification message broadcast by the road side facility 10 through the on board wireless communication processor 23, and then obtains its own longitude and latitude location information and absolute elevation information from the positioning navigation processor 22. The on board decision-making processor 24 makes a safety warning decision for the vehicle 20 according to the longitude and latitude location information and absolute elevation information of its own vehicle, as well as the longitude and latitude location information and the road side map-based relative elevation representation of the traffic object included in the road side notification message. For example, assuming that the traffic object is specifically a road event in which the road is icy, the on board decision-making processor 24 may determine whether to issue vehicle safety warning information to the driver, to remind the driver to pay attention to a road surface condition, thereby ensuring driving safety.

In different application scenarios, specific decision-making logic used by the on board decision-making processor 24 may be different, and the specific decision-making logic used by the on board decision-making processor 24 may be determined according to an actual vehicle-infrastructure cooperation application scenario.

In a process of making the safety warning decision for the vehicle 20 by the on board decision-making processor 24, a location relationship between the traffic object and the vehicle needs to be compared, to determine whether the traffic object is on the same road on which the vehicle 20 is located and determine a spacing between the traffic object and the vehicle 20. However, since the road side notification message carries the road side map-based relative elevation representation of the traffic object, manners for obtaining the relative elevation representation of the road in the on board map processor 21 and the road side map processor 11 may be different. In a case that a location of the traffic object needs to be precisely compared with a location of the vehicle, the on board map processor 21 and the road side map processor 11 need to have consistent understanding for relative elevation information.

Exemplarily, for the same road, assuming that a road side map-based relative elevation representation obtained by the road side map processor 11 based on its own preset relative elevation representation rule is "1", and an on board map-based relative elevation representation obtained by the on board map processor 21 according to its own preset relative elevation representation rule is "2", the vehicle 20 learns that the road side map-based relative elevation representation is "1" when receiving the road side notification message broadcast by the road side facility 10, but the on board map processor 21 cannot obtain the road on which the traffic object is actually located according to the relative elevation representation "1", thereby unable to accurately comparing the location of the traffic object and the location of the vehicle. As a result, the on board decision-making processor 24 cannot make the safety warning decision for the vehicle 20, thereby leading to a driving risk of the vehicle 20.

Within the coverage range of the road side notification message, the peripheral road network information of the vehicle 20 is roughly the same as the peripheral road network information of the road side facility 10. The relative elevation representation of the traffic object is specifically a relative elevation representation of a road on which the traffic object is located.

To enable the on board map processor 21 and the road side map processor 11 to have consistent understanding for the relative elevation representation of the same road, the on board map server 30 disposed in the cooperative vehicle-infrastructure system provided in this embodiment of the disclosure establishes communication connections with the on board map processor 21 and the road side map processor 11. The on board map server 30 can learn a representation manner of the road side map processor 11 for the relative elevation representation of the road by communicating with the road side map processor 11. The on board map server 30 also serves as a map data server of the vehicle 20 to provide map data to the on board map processor 21. For example, the on board map server 30 obtains the real-time location of the vehicle 20, extracts the peripheral road network information of the vehicle 20 from the map data stored by itself, obtains the on board map-based relative elevation representations of the roads around the vehicle 20, and synchronizes the peripheral road network information of the vehicle 20 and the on board map-based relative elevation representations of the roads around the vehicle 20 to the on board map processor 21. In this way, the on board map server 30 can learn a representation manner of the on board map processor 21 for the relative elevation representation of the road.

On the basis that the on board map server 30 can obtain the representation manners of the road side map processor 11 and the on board map processor 21 for the relative elevation representation of the road, the on board map server 30 can obtain a conversion relationship between the road side map-based relative elevation representation and the on board map-based relative elevation representation of the same road, and updates and maintains the conversion relationship. The on board map server 30 also synchronizes the conversion relationship maintained by itself to the on board map processor 21, so that the on board map processor 21 can reach a consensus with the road side map processor 11 on the relative elevation representation of the same road based on the conversion relationship.

Exemplarily, in a case that a road side map-based relative elevation representation of a certain road is "$\Delta Vzn$", and an on board map-based relative elevation representation of the road is "$\Delta zn$", a conversion relationship between the road side map-based relative elevation representation and the on board map-based relative elevation representation of the road may be represented as R(ΔVzn, Δzn). For the road side map-based relative elevation representation of the road, the on board map processor 21 can obtain the on board map-based relative elevation representation of the road according to the corresponding conversion relationship.

For a detailed process of updating and maintaining the conversion relationship between the road side map-based relative elevation representation and the on board map-based relative elevation representation of the same road by the on board map server 30, reference may be made to records in the subsequent embodiments, and details are described herein again.

The on board map server 30 also synchronizes the updated conversion relationship to the on board map processor 21 in time, to ensure that the consistent understanding of the on board map processor 21 and the road side map processor 11 for the relative elevation representation is also synchronous and timely.

In addition, it is considered that map data loaded in the on board map processors deployed in different vehicles comes from different map data service organizations, and these different map data service organizations have different representation manners for the relative elevation representation. To ensure that the on board map processors and the road side map processors deployed in different vehicles have consistent understanding for the relative elevation representation, in some embodiments, there are a plurality of vehicles included in the cooperative vehicle-infrastructure system, and different vehicles communicate with different on board map servers. These different on board map servers provide map data services to different vehicles.

Figure 3:
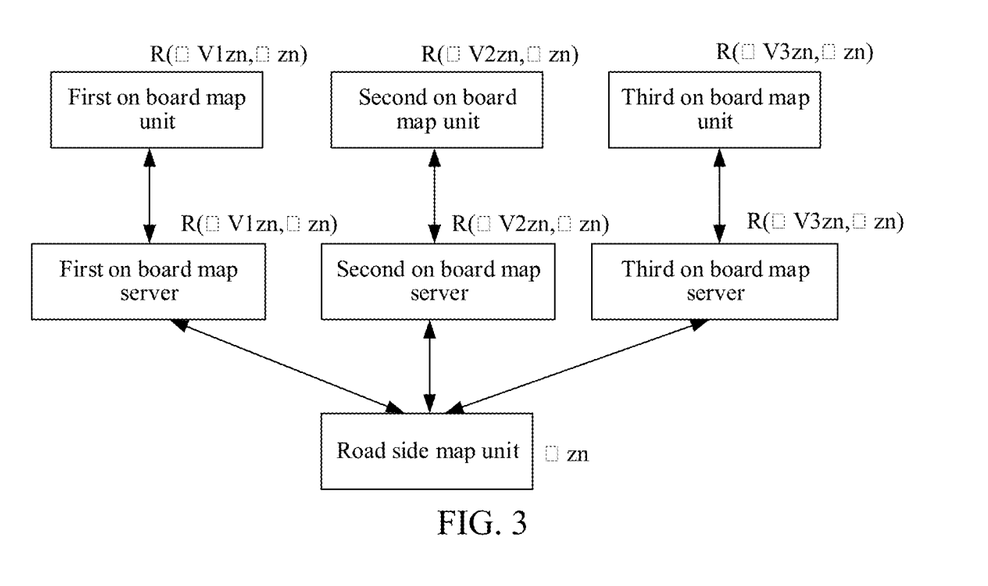
FIG. 3 is a schematic structural diagram of a cooperative vehicle-infrastructure system, according to some embodiments.

As shown in FIG. 3, the exemplary cooperative vehicle-infrastructure system includes a first on board map server, a second on board map server, and a third on board map server, where the first on board map server is configured to provide a map data service to a first on board map processor deployed in a first vehicle, the second on board map server is configured to provide a data service to a second on board map processor deployed in a second vehicle, and the third on board map server is configured to provide a data service to a third on board map processor deployed in a third vehicle. In some embodiments, the on board map processor may transmit information to each server.

As shown in FIG. 3, the road side map processor deployed in the road side facility is in communication connection with different on board map servers. Different on board map servers can learn that a relative elevation representation of the road side map processor for a certain road is "Δzn", and maintain conversion relationships R(ΔV1zn, Δzn), R(ΔV2zn, Δzn), and R(ΔV3zn, Δzn), and simultaneously synchronize the maintained conversion relationships to the on board map processors connected to them.

In a case that a road side map-based relative elevation representation of a designated road is updated in the road side map processor, the road side map processor transmits an updated relative elevation representation of the designated road to different on board map servers, so that different on board map servers update corresponding conversion relationships maintained by the different on board map servers.

In addition, after updating the corresponding conversion relationships, the different on board map servers also synchronize updated conversion relationships to the corresponding on board map processors, so that the different on board map processors can update the corresponding conversion relationships with the update of the relative elevation representations in the road side map processor, thereby maintaining the consistent understanding of the road side map processor for the relative elevation representation.

Different on board map service organizations may express road network information differently, and specific road network expressions are embodied by on board map servers of the on board map data service organizations. The same road is set to have the same road identifier in the on board map processors deployed in different vehicles and the road side map processor, which can ensure uniqueness of the road in the map data.

Figure 4:
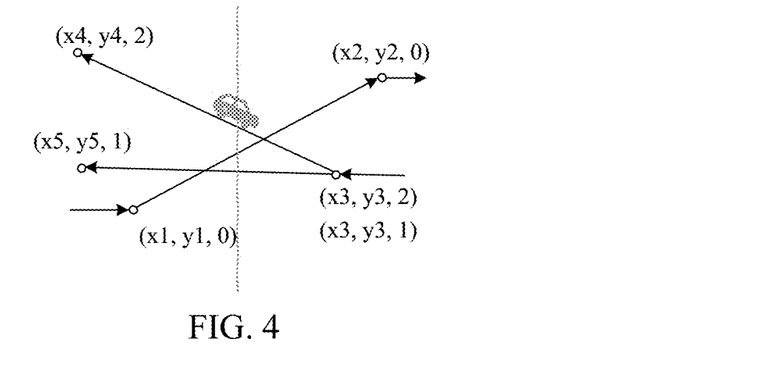
FIG. 4 is a schematic diagram of an exemplary peripheral road network, according to some embodiments.

In the on board map processor and the road side map processor, maintenance for a peripheral road network may be that location information of all directed road sections in the peripheral road network is maintained within a coverage range thereof, that is, the plurality of roads around the road side facility are represented through the directed road sections in the peripheral road network information of the road side facility, and the plurality of roads around the vehicle are also represented through the directed road sections in the peripheral road network information of the vehicle. A direction of the directed road section is used for representing a driving direction of a lane. The directed road section is formed by two road section nodes, and a center of the directed road section represents a road reference point on the directed road section. For example, an exemplary peripheral road network shown in FIG. 4 includes a directed road section formed by connecting road section endpoints (x1, y1,0) and (x2,y2,0), a directed road section formed by connecting road section endpoints (x3,y3,1) and (x5,y5,1), and a directed road section formed by connecting road section endpoints (x3,y3,2) and (x4,y4,2). The last elements in the coordinates of the road section endpoints represents a relative elevation representation of a corresponding road section.

Figure 5:
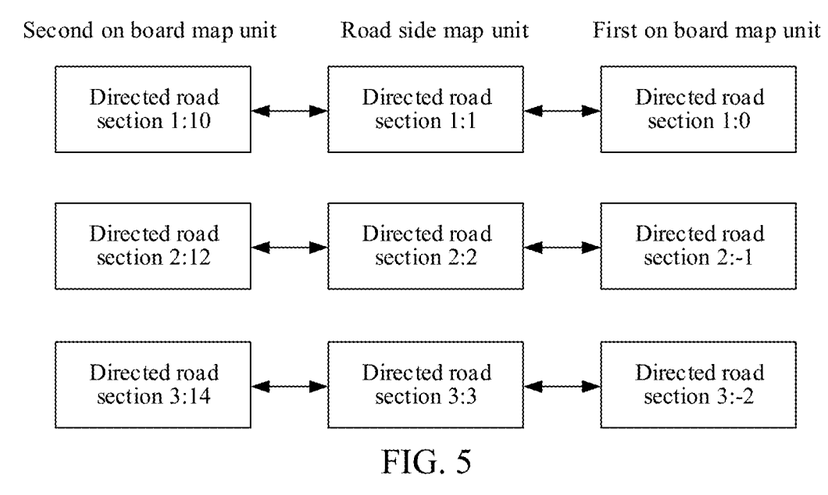
FIG. 5 is a schematic diagram of a road section identifier, according to some embodiments.

In the on board map processors deployed in different vehicles and in the road side map processor, road section identifiers of the same directed road section included in the same road are also the same. As shown in FIG. 5, in the road side map processor, the first on board map processor, and the second on board map processor, the road section identifiers of the same directed road section are the same, but the relative elevation representations are different (the relative elevation representation is a value after ":").

In an exemplary embodiment, the road side map processor may determine the road side map-based relative elevation representation of each of the plurality of roads around the road side facility according to a preset first relative elevation representation rule. The first relative elevation representation rule is used for describing a manner of determining the relative elevation representation of each road according to the spatial location relationship between the plurality of roads around the road side facility, and the relative elevation representations corresponding to the plurality of roads are different from each other. Exemplarily, in the first relative elevation representation rule, how to select a road from a plurality of roads as the relative basal plane is restricted, and a relative elevation representation is assigned to the relative basal plane. Then, according to layer differences between other roads and the relative basal plane, corresponding relative elevation representations are assigned to the roads.

Detailed content of the first relative elevation representation rule may be set according to an actual application scenario, and this is not limited herein. In a case that the preset first relative elevation representation rule in the road side map processor is updated, the road side map-based relative elevation representation of each road in the peripheral road network information maintained by the road side map processor is also correspondingly updated, to trigger the on board map server to correspondingly update the conversion relationship maintained by itself.

The on board map processor may determine the on board map-based relative elevation representation of each of the plurality of roads around the vehicle according to a preset second relative elevation representation rule. The second relative elevation representation rule is used for describing a manner of determining the relative elevation representation of each road according to the spatial location relationship between the plurality of roads around the vehicle, and the relative elevation representations corresponding to the plurality of roads are different from each other.

Similarly, detailed content of the second relative elevation representation rule may also be set according to an actual application scenario. The second relative elevation representation rule is usually different from the first relative elevation representation rule provided in the road side map processor, and therefore the on board map processor and the road side map processor have different relative elevation representations for a road in the same peripheral road network.

The second relative elevation representation rule may be transmitted by the on board map server to the on board map processor. The on board map server does not need to notify the road side map processor when having updated the second relative elevation representation rule, but directly updates the conversion relationship maintained by itself, and synchronizes an updated conversion relationship and an updated second relative elevation representation rule to the on board map processor.

According to the cooperative vehicle-infrastructure system provided in the foregoing embodiment of the disclosure, it can be ensured that the road side facility and the vehicle can have consistent understanding for the relative elevation representation of the road in the map road network. In this way, in a multi-layer road network scenario of urban roads such as an overpass, and a viaduct, and a fly-over junction, or of expressways, in a case that the road side facility transmits a road side notification message such as an RSI and RSM based on the relative elevation representation, the on board map processor can correctly parse the road side notification message without generating an early warning misreport, thereby ensuring that the cooperative vehicle-infrastructure system can be precisely and effectively commercialized on a large scale in compliance with the laws and regulations.

Figure 6:
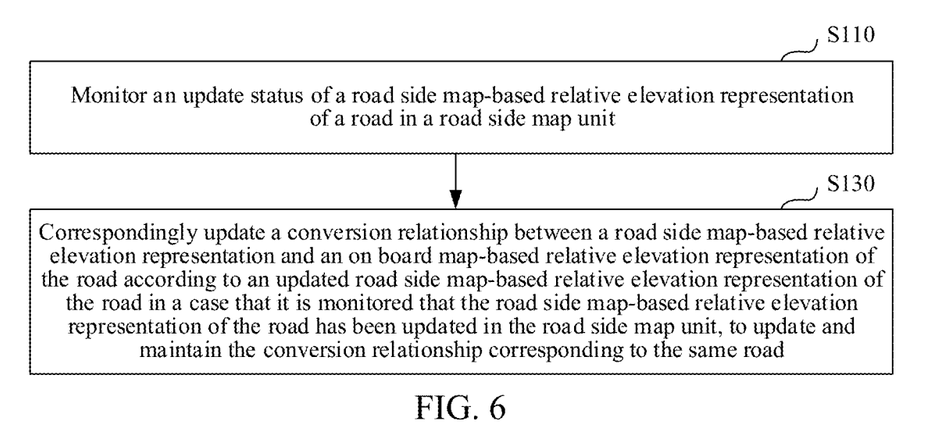
FIG. 6 is a flowchart of an elevation conversion update method based on vehicle-infrastructure cooperation, according to some embodiments.

FIG. 6 is a flowchart of an elevation conversion update method based on vehicle-infrastructure cooperation according to an exemplary embodiment of the disclosure. The method is applicable to the cooperative vehicle-infrastructure system shown in FIG. 2, and is specifically performed by the on board map server 30 in the cooperative vehicle-infrastructure system, to update and maintain a conversion relationship between a road side map-based relative elevation representation and an on board map-based relative elevation representation of the same road.

As shown in FIG. 6, the method includes at least operation S110 to operation S130. A detailed description is as follows:

Operation S110. Monitor an update status of a road side map-based relative elevation representation of a road in the road side map processor; and Operation S130. Correspondingly update a conversion relationship between a road side map-based relative elevation representation and an on board map-based relative elevation representation of the road according to an updated road side map-based relative elevation representation of the road in a case that it is monitored that the road side map-based relative elevation representation of the road has been updated in the road side map processor, to update and maintain the conversion relationship corresponding to the same road.

For a structure and function of a component configured to constitute the cooperative vehicle-infrastructure system, such as the road side map processor mentioned in this method, reference may be made to the descriptions in the embodiment shown in FIG. 2. Details are not described in this embodiment again.

In this embodiment, through operation S110, the on board map server 30 can learn the update status of the relative elevation representation of the road in the road side map processor in a timely manner, and through operation S130, the on board map server can update the conversion relationship maintained by itself in a timely manner.

Exemplarily, the on board map server periodically transmits an inquiry message to the road side map processor, the inquiry message being used for determining whether the road side map-based relative elevation representation of the road in the road side map processor is changed. The on board map server determines that the road side map-based relative elevation representation of the road in the road side map processor is not changed when receiving a confirmation message returned by the road side map processor. The on board map server determines that a road side map-based relative elevation representation of a designated road is updated when receiving the road side map-based relative elevation representation of the designated road returned by the road side map processor.

The designated road is a road whose road side map-based relative elevation representation has been updated, and may include a newly added road or an existing road in the road side map processor. That is, regardless of whether a road is newly added in the road side map processor, for example, one or more roads are newly constructed, or of whether a road side map-based relative elevation representation of an existing road is updated in the road side map processor, the on board map server learns the update status of the road side map-based relative elevation representation in a timely manner, and correspondingly updates the conversion relationship maintained by itself.

In some embodiments, in a case that the road side map-based relative elevation representation of the designated road is updated in the road side map processor, the road side map processor transmits an updated relative elevation representation of the designated road to the on board map server. After receiving the road side map-based relative elevation representation of the designated road transmitted by the road side map processor, the on board map server returns the confirmation message to the road side map processor, uses the received relative elevation representation as the updated relative elevation representation of the designated road, and correspondingly updates a conversion relationship corresponding to the designated road according to the updated relative elevation representation of the designated road. In a case that the on board map processor does not receive the confirmation message returned by the on board map server within a designated time period, the on board map processor retransmits the updated relative elevation representation of the designated road to the on board map server.

In some embodiments, the on board map server is actively triggered by the road side map processor to update the conversion relationship maintained in the on board map server. The on board map server can also obtain the update of the relative elevation representation involved in the road side map processor.

In the cooperative vehicle-infrastructure system provided in some embodiments of the disclosure, the road side map processor deployed in the road side facility is configured to maintain the peripheral road network information of the road side facility and obtain the road side map-based relative elevation representations of the plurality of roads around the road side facility according to the peripheral road network information of the road side facility; and the on board map processor deployed in the vehicle is configured to maintain the peripheral road network information of the vehicle and obtain the on board map-based relative elevation representations of the plurality of roads around the vehicle according to the peripheral road network information of the vehicle, so that the absolute elevation information is replaced by the representation manner of the relative elevation representation, thereby avoiding that the elevation information is directly provided to the outside world.

In addition, by applying the method provided in this embodiment to the cooperative vehicle-infrastructure system shown in FIG. 2, the on board map server can update the conversion relationship maintained by itself in a timely manner, and can also synchronize the updated conversion relationship to the on board map processor in a timely manner, so that the on board map processor and the road side map processor have highly consistent understanding for the relative elevation representation of the road in the map road network. On this basis, accurate early warning of the vehicle can be achieved, and the cooperative vehicle-infrastructure system can be precisely and effectively applied on a large scale.

Figure 7:
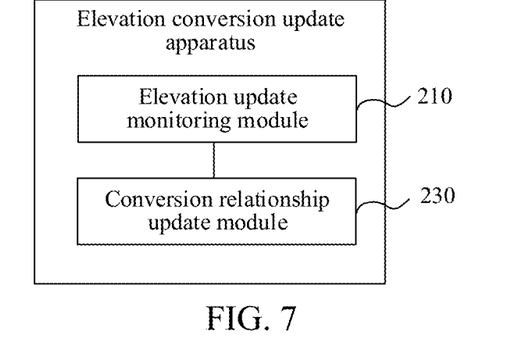
FIG. 7 is a block diagram of an elevation conversion update apparatus based on vehicle-infrastructure cooperation, according to some embodiments.

FIG. 7 is a block diagram of an elevation conversion update apparatus based on vehicle-infrastructure cooperation according to an exemplary embodiment of the disclosure. The apparatus is applicable to the cooperative vehicle-infrastructure system shown in FIG. 2, and is deployed on the on board map server in the cooperative vehicle-infrastructure system. As shown in FIG. 7, the apparatus includes:

an elevation update monitoring module 210, configured to monitor an update status of a road side map-based relative elevation representation of a road in a road side map processor; and a conversion relationship update module 230, configured to correspondingly update a conversion relationship between a road side map-based relative elevation representation and an on board map-based relative elevation representation of the road according to an updated road side map-based relative elevation representation of the road in a case that it is monitored that the road side map-based relative elevation representation of the road has been updated in the road side map processor, to update and maintain a conversion relationship corresponding to the same road.

In some exemplary embodiments, the elevation update monitoring module 210 includes:

a message inquiry processor, configured to periodically transmit an inquiry message to the road side map processor, the inquiry message being used for determining whether the road side map-based relative elevation representation of the road in the road side map processor is changed; a first result determination processor, configured to determine, in a case that a confirmation message returned by the road side map processor is received, that the road side map-based relative elevation representation of the road in the road side map processor is not changed; and a second result determination processor, configured to determine, in a case that a road side map-based relative elevation representation of a designated road returned by the road side map processor is received, that the road side map-based relative elevation representation of the designated road is updated.

In some exemplary embodiments, the elevation update monitoring module 210 includes:

an elevation information receiving processor, configured to receive the road side map-based relative elevation representation of the designated road transmitted by the road side map processor, to use the received relative elevation representation as an updated relative elevation representation of the designated road, and correspondingly update a conversion relationship corresponding to the designated road according to the updated relative elevation representation of the designated road; and a confirmation message returning processor, configured to return the confirmation message to the road side map processor.

The apparatus provided in the foregoing embodiment and the method provided in the preceding embodiment are based on the same concept. The specific manners of performing operations by each module and processor of the apparatus have been described in detail in the method embodiment, and are omitted here.

Some embodiments of the disclosure further provide an on board map server, including a processor and a memory, the memory storing computer-readable instructions, the computer-readable instructions, when executed by the processor, implementing the elevation conversion update method based on vehicle-infrastructure cooperation described above.

Figure 8:
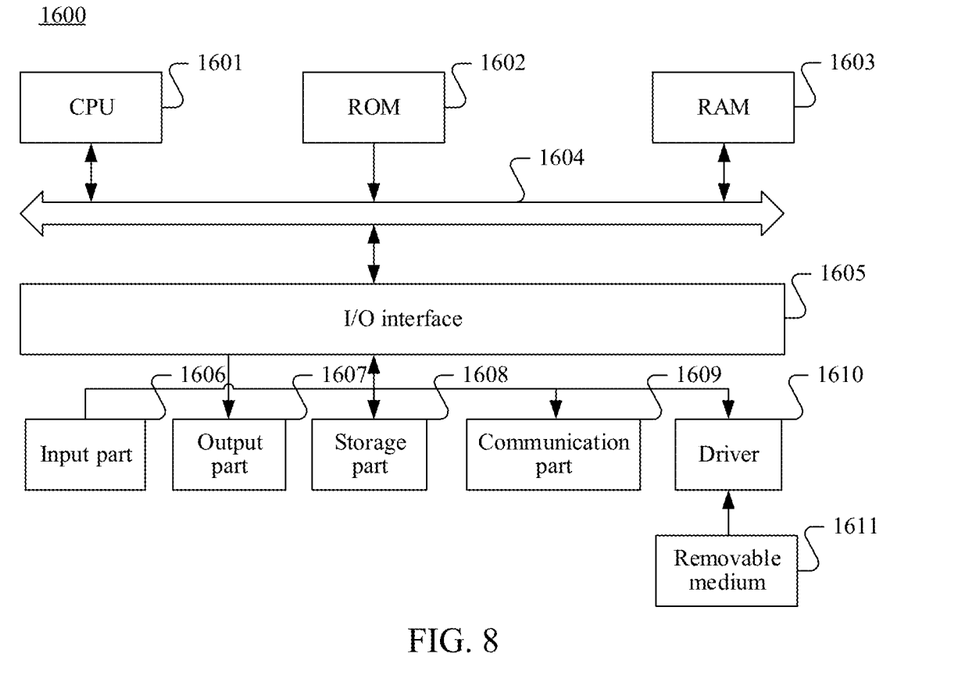
FIG. 8 shows a schematic structural diagram of a computer system of an on board map server, according to some embodiments.

FIG. 8 shows a schematic structural diagram of a computer system of an on board map server adapted to implement the embodiments of the disclosure.

A computer system 1600 of the on board map server shown in FIG. 8 is merely an example, and is not to impose any restriction on functions and scopes of use of the embodiments of the disclosure.

As shown in FIG. 8, the computer system 1600 includes a central processing processor (CPU) 1601, which can execute various appropriate actions and processing according to a program stored in a read-only memory (ROM) 1602 or a program loaded from a storage part 1608 to a random access memory (RAM) 1603, such as performing the methods described in the foregoing embodiments. The RAM 1603 further stores various programs and data required for operating the system. The CPU 1601, the ROM 1602, and the RAM 1603 are connected to each other through a bus 1604. An input/output (I/O) interface 1605 is also connected to the bus 1604.

The following components are connected to the I/O interface 1605: an input part 1606 including a keyboard, a mouse, or the like, an output part 1607 including a cathode ray tube (CRT), a liquid crystal display (LCD), a speaker, or the like, a storage part 1608 including a hard disk, or the like, and a communication part 1609 including a network interface card such as a local area network (LAN) card or a modem. The communication part 1609 performs communication processing by using a network such as the Internet. A drive 1610 is also connected to the I/O interface 1605 as required. A removable medium 1611, such as a magnetic disk, an optical disc, a magneto-optical disk, or a semiconductor memory, is installed on the drive 1610 as required, so that a computer program read from the removable medium is installed into the storage part 1608 as required.

Particularly, according to some embodiments of the disclosure, the processes described above by referring to the flowcharts may be implemented as computer software programs. For example, some embodiments of the disclosure includes a computer program product. The computer program product includes a computer program stored in a computer-readable medium. The computer program includes a computer program used for performing a method shown in the flowchart. In such some embodiments, the computer program may be downloaded and installed through the communication part 1609 from a network, and/or installed from the removable medium 1611. When the computer program is executed by the CPU 1601, the various functions defined in the system of the disclosure are executed.

The computer-readable medium shown in some embodiments of the disclosure may be a computer-readable signal medium or a computer-readable storage medium or any combination thereof. The computer-readable storage medium may be, for example, an electrical, magnetic, optical, electromagnetic, infrared, or semiconductor system, apparatus, or device, or any combination thereof. A more specific example of the computer-readable storage medium may include but is not limited to: an electrical connection having one or more wires, a portable computer magnetic disk, a hard disk, a random access memory (RAM), a read-only memory (ROM), a flash memory, an optical fiber, an optical storage device, a magnetic storage device, or any appropriate combination thereof.

The flowcharts and block diagrams in the accompanying drawings illustrate possible system architectures, functions, and operations that may be implemented by a system, a method, and a computer program product according to various embodiments of the disclosure. Each box in a flowchart or a block diagram may represent a module, a program segment, or a part of code. The module, the program segment, or the part of code includes one or more executable instructions used for implementing designated logic functions. In some implementations used as substitutes, functions annotated in boxes may occur in a sequence different from that annotated in an accompanying drawing. For example, actually two boxes shown in succession may be performed basically in parallel, and sometimes the two boxes may be performed in a reverse sequence. This is determined by a related function. Each box in the block diagram or the flowchart, and a combination of blocks in the block diagram or the flowchart may be implemented by using a dedicated hardware-based system that performs a specified function or operation, or may be implemented by using a combination of dedicated hardware and computer instructions.

A related processor described in some embodiments of the disclosure may be implemented in a software manner, or may be implemented in a hardware manner, and the processor described may also be set in a processor. Names of the processors do not constitute a limitation on the processors in a specific case.

According to another aspect of the disclosure, a computer-readable storage medium is further provided, on which a computer program is stored. The computer program, when executed by a processor, implements the elevation conversion update method based on vehicle-infrastructure cooperation as described above. The computer-readable storage medium may be included in the on board map server described in the foregoing embodiments, or may exist alone and is not disposed in the on board map server.

According to another aspect of the disclosure, a computer program product or a computer program is further provided, including computer instructions, the computer instructions being stored in a computer-readable storage medium. A processor of a computer device reads the computer instructions from the computer-readable storage medium, and executes the computer instructions, so that the computer device performs the elevation conversion update method based on vehicle-infrastructure cooperation provided in the foregoing embodiments.

What is described above is merely exemplary embodiments of the disclosure, and is not intended to limit the embodiments of the disclosure. A person of ordinary skill in the art can easily make equivalent changes or modifications according to the main concept and spirit of the disclosure. Therefore, the protection scope of the disclosure is subject to the protection scope specified in the claims.

What is claimed is:

1. A cooperative vehicle-infrastructure system, comprising:
 a road side facility;
 a plurality of on-road vehicles; and
 at least one map server corresponding to the plurality of on-road vehicles, wherein the road side facility includes a road side map processor deployed adjacent to the road side facility that is configured to load peripheral road network information of the road side facility, the road side map processor converting absolute elevation information of a plurality of roads around the road side facility into road side map-based relative elevation representations according to the peripheral road network information of the road side facility, the road side map-based relative elevation representation being used for describing a spatial location relationship between the plurality of roads around the road side facility, wherein the road side map processor is configured to perform perception positioning of a traffic object by detecting the traffic object using a camera or radar module and, after the detecting, converting an absolute elevation of the traffic object to a road side map-based relative elevation representation according to the peripheral road network information of the road side facility, wherein the traffic object is different from the plurality of on-road vehicles;
 the plurality of vehicles each comprising a map processor that is configured to load the peripheral road network information of the plurality of vehicles, the map processors converting absolute elevation information of a plurality of roads around the vehicle into the map-based relative elevation representations according to the peripheral road network information of the vehicle, the map-based relative elevation representation being used for describing a spatial location relationship between the plurality of roads around the vehicle; and
 the at least one map server communicating with the road side map processor and the map processors, updating and maintaining a conversion relationship between the road side map-based relative elevation representation and the map-based relative elevation representation of the same road, and synchronizing an updated conversion relationship to the map processors,
 wherein the plurality of roads around the road side facility are represented by directed road sections in the peripheral road network information of the road side facility, and wherein a road side elevation representation in the road side map processor is different than a road side elevation representation in an onboard processor of a vehicle from the plurality of vehicles for a same directed road section from the plurality of roads.

2. The system according to claim 1, wherein the plurality of vehicles, communicate with the at least one map server, and the road side map processor is in communication with the at least one map server, and when a road side map-based relative elevation representation of a designated road is updated in the road side map processor, the road side map processor transmits an updated relative elevation representation of the designated road to the at least one map server.

3. The system according to claim 2, wherein each road comprises a corresponding identifier that is consistent in both the map processors of the plurality of vehicles and the road side map processor.

4. The system according to claim 2, wherein the designated road refers to a road whose road side map-based relative elevation representation has been updated, and comprises a newly added road or an existing road in the road side map processor.

5. The system according to claim 1, wherein the road side map processor determines the road side map-based relative elevation representation of each of the plurality of roads around the road side facility according to a preset first relative elevation representation rule, wherein the first relative elevation representation rule is used for describing a manner of determining the relative elevation representation of each road according to the spatial location relationship between the plurality of roads around the road side facility, and the relative elevation representations corresponding to the plurality of roads are different from each other.

6. The system according to claim 5, a direction of the directed road section is used for representing a driving direction of a lane, the directed road section is formed by two road section nodes, and a center of the directed road section represents a road reference point on the directed road section.

7. The system according to claim 6, wherein a relative elevation representation of a road section endpoint of the directed road section is the same as a relative elevation representation of the road reference point on the directed road section, and in a case that at least two directed road sections in the same direction have road section nodes with overlapping longitude and latitude locations, the road section nodes with overlapping longitude and latitude locations have at least two relative elevation representations.

8. The system according to claim 1, wherein the map processor determines the map-based relative elevation representation of each of the plurality of roads around the vehicle according to a preset second relative elevation representation rule, wherein the second relative elevation representation rule is used for describing a manner of determining the relative elevation representation of each road according to the spatial location relationship between the plurality of roads around the vehicle, and the relative elevation representations corresponding to the plurality of roads are different from each other.

9. The system according to claim 8, wherein the second relative elevation representation rule is transmitted by the map server to the map processor, wherein the map server does not notify the road side map processor in a case that the map server has updated the second relative elevation representation rule, but directly updates the conversion relationship corresponding to the same road, and synchronizes an updated conversion relationship and an updated second relative elevation representation rule to the map processor.

* * * * *